March 1, 1955  M. MAUL ET AL  2,703,142
PUNCHING MACHINE FOR MULTIPLE DECK RECORD CARDS
Filed July 25, 1951  10 Sheets-Sheet 1

Fig. 1

Inventors
MICHAEL MAUL AND
MAX PFEIFFER
BY
ATTORNEY

March 1, 1955 M. MAUL ET AL 2,703,142
PUNCHING MACHINE FOR MULTIPLE DECK RECORD CARDS
Filed July 25, 1951 10 Sheets-Sheet 4

Inventors
MICHAEL MAUL AND
MAX PFEIFFER
ATTORNEY

Fig. 8

Inventors
MICHAEL MAUL AND
MAX PFEIFFER
BY
ATTORNEY

March 1, 1955   M. MAUL ET AL   2,703,142
PUNCHING MACHINE FOR MULTIPLE DECK RECORD CARDS
Filed July 25, 1951   10 Sheets-Sheet 7

Inventors
MICHAEL MAUL AND
MAX PFEIFFER
BY
ATTORNEY

March 1, 1955 M. MAUL ET AL 2,703,142
PUNCHING MACHINE FOR MULTIPLE DECK RECORD CARDS
Filed July 25, 1951 10 Sheets-Sheet 8

Inventors
MICHAEL MAUL AND
MAX PFEIFFER
BY
ATTORNEY

March 1, 1955  M. MAUL ET AL  2,703,142
PUNCHING MACHINE FOR MULTIPLE DECK RECORD CARDS
Filed July 25, 1951  10 Sheets—Sheet 10

Inventors
MICHAEL MAUL AND
MAX PFEIFFER
BY
ATTORNEY

United States Patent Office 2,703,142
Patented Mar. 1, 1955

2,703,142

PUNCHING MACHINE FOR MULTIPLE DECK RECORD CARDS

Michael Maul, Schwabach, near Nurnberg, and Max Pfeiffer, Nurnberg, Germany; said Pfeiffer assignor to said Maul Application July 25, 1951, Serial No. 238,431

Claims priority, application Germany December 21, 1950

3 Claims. (Cl. 164—113)

In perforated record cards it is usual to provide the perforated symbols in a plurality of superpositioned rows of card columns, said rows being usually designated as "perforation decks." Such provision is particularly necessary when hole combinations are used in order to obtain a convenient relation between the length and the width of the card. The still increasing requirements as regards the number of the record columns to be provided upon a card as well as with regard to the number of distinct characters (in addition to numerical characters also the letters of the alphabet) almost compels the employment of hole combinations. Therefore, the most practical method of punching such "multi-deck" cards (generally in the form of double deck cards) are becoming of increasing importance.

Key controlled machines for punching double deck cards have already become known in various types. In one type to which also the present invention belongs, a particularly simple and rapid operation is enabled therein that both decks may be punched column by column and one deck immediately after the other one without requiring for the punching of the second deck a carriage return or "deck shifting." This is obtained in machines of said type by providing for each deck an associated column of punches past which the card is fed column by column. The columns of punches are offset relatively to each other in the direction of the card feed by the length of one deck in such manner that the perforation decks will run successively past their associated punches. Selector bars controlled by a key board and common to both decks will determine the punch selection while punching is effected electromagnetically only for that deck which is fed below the punches associated with said deck. A machine of this type is for instance described in U. S. Patent 2,421,069.

Now, however, in the perforated record card system it frequently occurs that the data to be punched are indicated upon the card itself. The card is then document and original record for the perforations to be provided therein and is also a controlling element for the machine later controlled by the punched card. It is for this reason that such cards are also called "dual cards" because they represent the characters in written as well as in perforation symbols. The written characters may therein be provided in the usual manner offset relatively to their associated punch columns but in most punching machines (for instance also in the double deck punching machine according to U. S. Patent 1,962,607, reissued as Reissue 21,719) the card is covered over its whole width by the column of punches. However, it is just in dual cards that "sight perforation" is particularly desirable. This means that a space above or below the record column to be punched should still be visible during key actuation in order to permit the character inscribed in that space by hand or typewriter to be punched in the same column; for instance U. S. Patent 2,210,552 shows such a machine.

The known machine of the first mentioned type, see 2,421,069, having the advantage of the successive deck perforation without deck shifting and carriage return can, however, obtain such advantage only against considerable draw-backs with regard to other known machines. It will be seen that in the zone of the passing of the card from one to the other deck the card is invisible between both columns of punches. This means that for a number of columns no data can be derived from the card at all and that accordingly the machine is not generally applicable to dual cards. Since selector bars and the key board as well as key levers cover the whole space between the columns of punches offset relatively to each other, by the length of one deck, of course, still less is a sight perforation in the above indicated sense possible. And as a further disadvantage must be added that the machine cannot be constructed as an alphabet-machine since an alphabet key board would cover the greatest part of the card bed. Since, however, a punching machine sufficing present day requirements must not only be usable for dual cards and preferably for sight perforation but must also be adapted to be equipped with an alphabet key board, the known machine cannot meet such requirements.

It is now the main aim of the present invention to provide a machine of the first named type with successive perforation of a plurality of decks by a common key board without carriage return and deck shifting in which not only the perforation of dual cards but even a sight perforation is possible. In addition the invention provides a machine which can also be equipped with an alphabet key board, due to the fact that the key lever arrangement must not be provided above the card bed but that the key levers as well as the translator bars can be arranged in a known manner beneath the card.

It is true that a sight perforation is also possible in the machine according to U. S. Patent 2,210,552, however, in such a machine two separated manipulations are necessary for the punching of the second deck, namely the carriage return and the deck shifting operation.

It may therefore be said that the invention combines the advantages of the known machines and avoids the disadvantages of each of these machines. An additional desirable feature is its particular construction which is such that the machine resembles broadly a flat portable typewriter.

In order to attain the object of the invention it is chiefly important that the spaces below the columns of punches for the upper and the lower deck shall remain visible. The space below the lowermost column of punches can be left free in a relatively simple manner by providing a cut-away portion in the punch carrier.

According to the invention, in a machine of the above-mentioned type, the columns of punches leave the space below the associated record column sightfree, while a set of selector bars is provided which is common to both columns of punches offset relatively to each other by the height of a deck and by the length of a deck, these selector bars being adjusted by U-shaped controlling stirrups which embrace with their open sides the rear wall of the card bed and are there rockably mounted, the upper legs of said stirrups engaging the selector bars while their lower legs are rocked by translator bars provided in a known manner beneath the card bed and movable in a longitudinal direction by the key levers which actuate said translator bars in a known manner in accordance with different combinations.

In a preferred embodiment of the invention pivoted compensating levers are interposed between the translator bars and the lower legs of the U-shaped stirrups, said compensating levers having a leverage ratio such that equal displacements of all translator bars produce equal displacements of all selector bars irrespective of the distance from the stirrup pivot of the point of engagement of the translator bar with the lower leg of the stirrup.

The preferred embodiment of the invention described hereinafter uses a punch magnet for each individual record deck just the same as the known machine disclosed in U. S. Patent 2,421,069. However, only one punch magnet will become effective for punching depending upon the position of the card carriage relatively to the punches. It would, however, be equally possible to use only a single punch magnet if between the same and the punch yokes for the two decks a clutch connection were provided rendering only one of the two punching yokes effective depending upon the position of the card carriage.

The specification is directed to a punching machine for only two perforation decks. It is however evident that the invention may be applied just as well to cards having more than two perforation decks, the first two of them operating in the same manner as herein described and each further deck becoming then effective for punching subsequent to the foregoing deck in a similar manner as herein described.

The accompanying drawings illustrate a preferred embodiment of the invention, as applied to a machine for perforating double deck cards.

General explanations

In the machine casing 10 (Fig. 1) is a card bed 11 provided having an inclination of 15° relative to the horizontal, so that the data on the card may be easily read. The card bed 11 itself consists of a cast iron body which for reasons of simplicity will be hereinafter referred to as the bed. Upon the bed the card 12 is guided in a known manner by a card carriage 13. The card has two superpositioned perforation decks, each of them consisting of 25 columns. Each column has six hole positions so that all numerals and letters may be represented by hole-combinations. After moving the card to the right hand end position it will be fed column by column to the left upon key actuation. Punching is caused by the key board 14, which is constructed in the present instance as a numeral and letter key board, the characters on the keys having however been omitted in the drawing for reasons of simplicity. On its way to the left the card will first pass beneath the upper set of punches which will punch the upper deck column by column. When the last column of the upper deck has been punched, the first column of the lower deck will be moved past the lower set of punches. Both sets of punches are provided on the controlling head generally indicated at 17 and rockably mounted on hinges 18a and 18b. If the controlling head is in raised position there is an easy access to the card lying between the two stationary sets of punches.

The punch guides 46a and 46b for both sets of punches reach from the upper edge to the lower edge of the card bed in order to obtain a secure support for the punches. They are provided with sight recesses, so that in any instance the space of the card below the perforation column is "sight-free" and therefore "sight-perforation" may be effected. When the last column of the lower deck has passed the lower set of punches the carriage has reached its left hand end position. The handle 21 as well as the shifting bar of the carriage 13 will then extend appropriately far to the left of the machine since the card-carriage must be of such length that the left hand record column will be under the upper punches when the carriage handle 21 is to be left of the lower set of punches. In order to permit better gripping of the card upon insertion or removal a recess 11b is provided in the card bed. The carriage will now be moved with a newly inserted card to the right by means of handle 21 and then again a successive actuation of the key board may be effected until all columns of the card have been punched.

Punch selection

Upon depression of a key lever 22 the translator bars 23 (Figs. 2, 3, 4) are moved in a known manner sidewardly in different combinations. The combination code may be chosen at will and is determined by the teeth provided on the translator bars which are encountered by the key levers 22 upon depression of the latter. The translator bars are located in a cage 24 (Fig. 3) which at the same time serves as a comb-like guide for the key levers 22. The translator bars are guided between the pins 25 (Fig. 4) provided on both ends of the cage and fastened to the same, and between the rollers 26.

Figure 2:
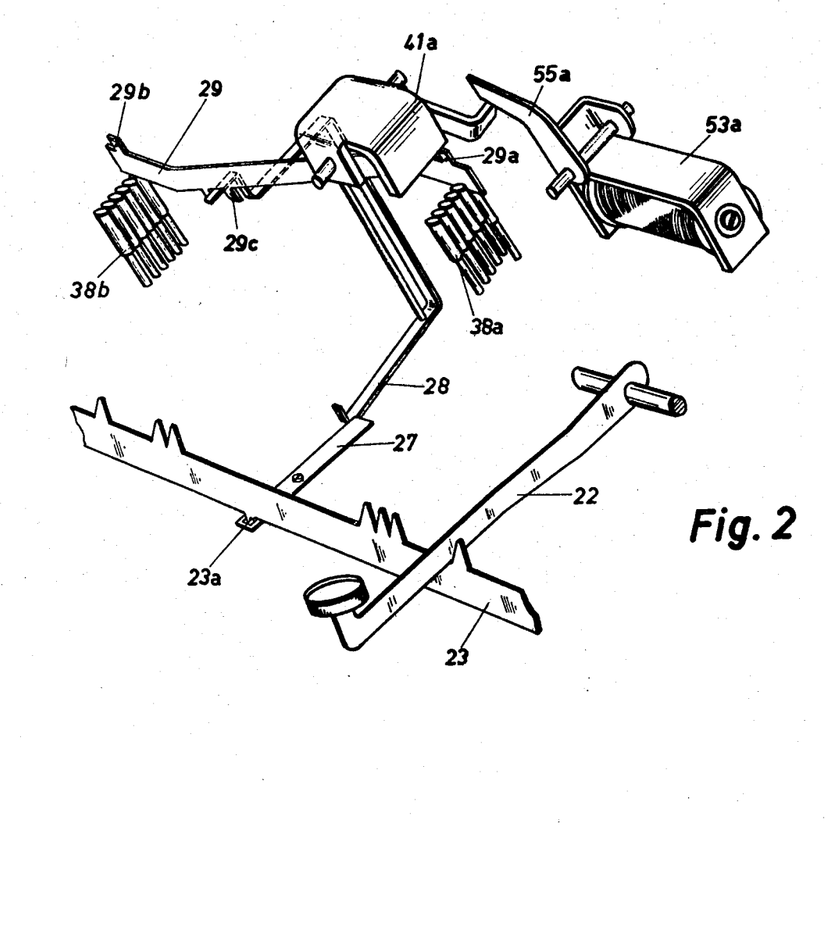
Fig. 2 is an operation diagram from which may be seen how a selector bar for the punches is moved by a key-controlled translator bar and how the selector bar is depressed by the selected punch magnet.
Figure 3:
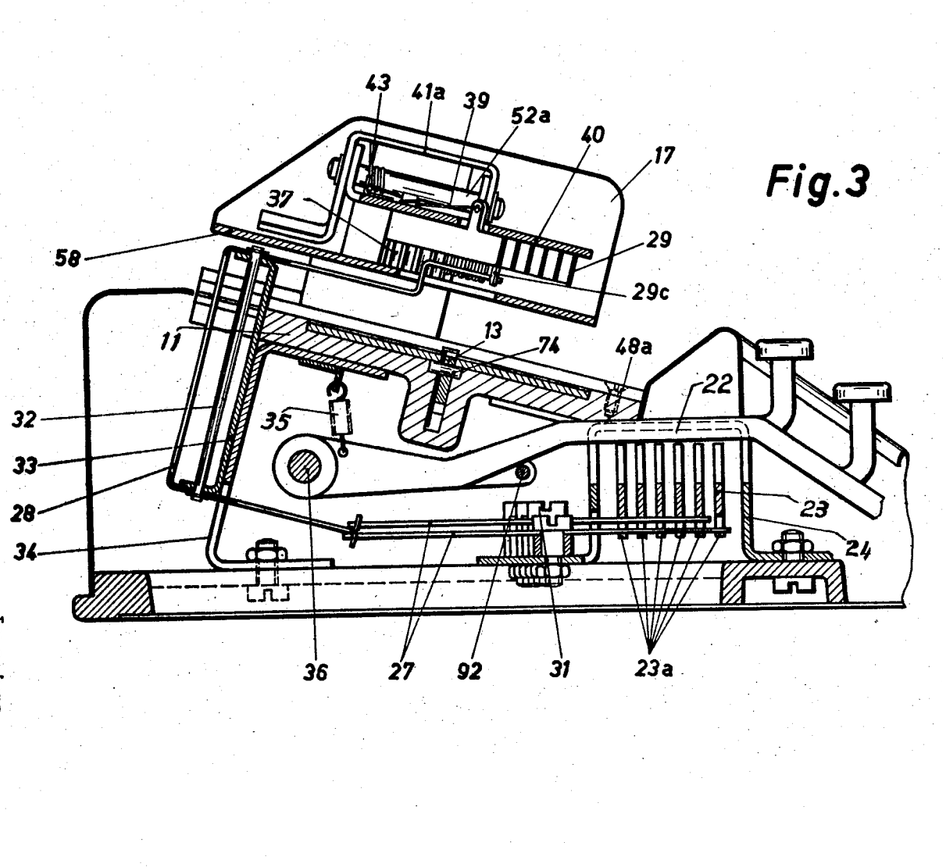
Fig. 3 is a section through the machine between the two sets of punches showing the control of the punch selector bars by the key levers through the translator bars and U-shaped intermediate levers.
Figure 4:
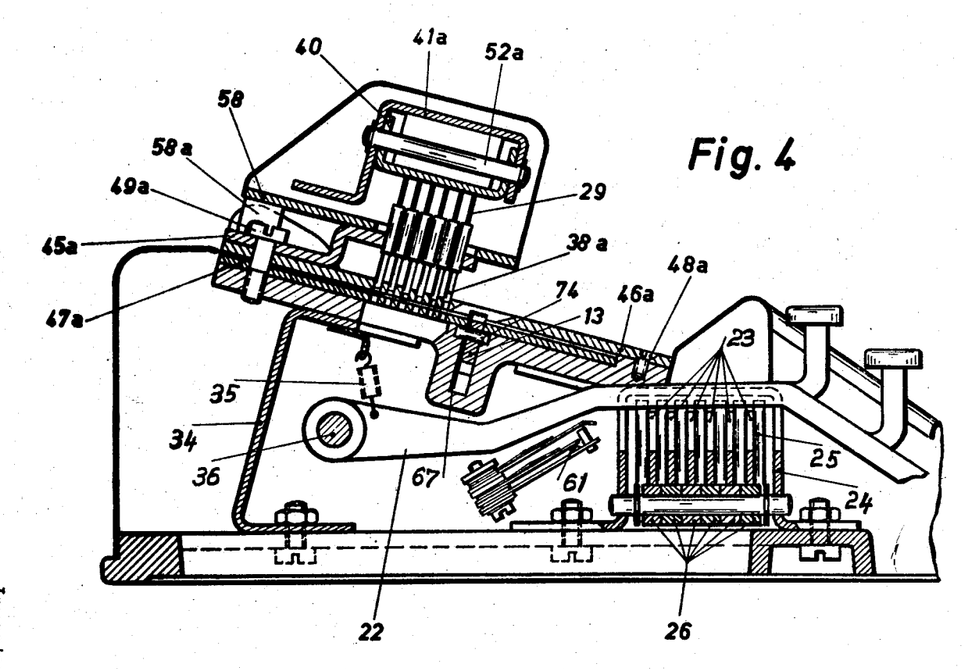
Fig. 4 is a section through the machine taken through the upper set of punches.
Figure 13:
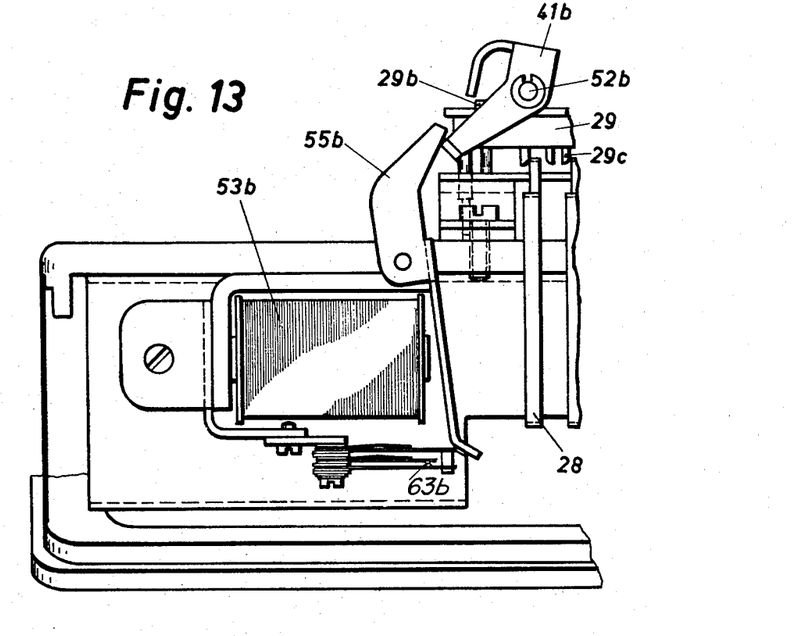
Fig. 13 shows the electro-magnetic punch actuating mechanism for the lower deck as viewed from the rear side of the machine.
Figure 15:
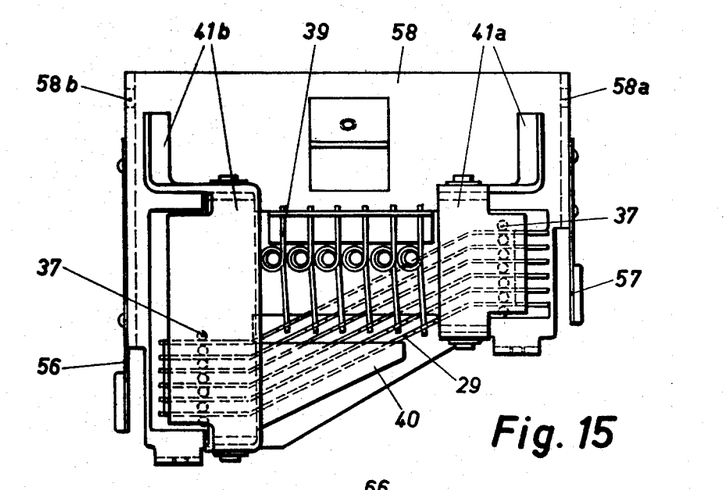
Fig. 15 is a top view of the controlling head with the cover removed; this controlling head may be raised on the machine together with the selector bars and the punching yokes fastened to said controlling head.

The movement of the translator bars is transferred through compensation levers 27 and U-levers 28 (Figs. 2, 3, 15) to the respective selector bars 29, one compensation lever and one U-lever being provided for each bar. A nose 23a of the translator bar engages into the associated compensation lever 27 (Fig. 2) and the other end of the compensation lever engages the lower leg of the U-lever 28. The compensation levers 27 are inserted in order to obtain equal movements of all selector bars with respect to the punches. The compensation levers 27 are rockably mounted upon the cage 24 (Fig. 3) by means of screws 31. The U-levers 28 are held by the pins 32 and the angle 33 and embrace with their upper legs the noses 29c of the selector bars (Figs. 2, 3 and 13). There must be sufficient space between the upper edge of the U-levers and the lower edge of the selector bars so that upon punching the selector bars will not be hindered from depression by the U-levers. The angle 33 is fastened to the angle 34 by means of screws. To the latter are also fastened the springs 35 drawing the key levers, rockably mounted upon the axle 36, upwardly against the bed 11, serving as stop. The bed 11 extends over the whole width of the key board above the cage 24 the upper surface of the latter lying in the same plane as the upper edge of the key levers.

Figure 6:
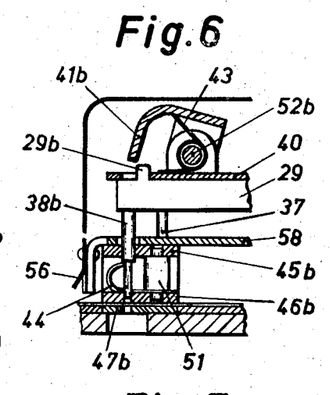
Fig. 6 shows the lower set of punches and a part of the controlling head in section as viewed from the front side of the machine.

The selector bars 29 (Figs. 6, 15) are guided in the controlling head 17 by means of pins 37. The selector bars rest upon the associated punches 38a, 38b (Fig. 2) of the upper and lower set of punches. By springs 39 (Figs. 3 and 15) the selector bars 29 are pressed upwardly against the plate 40 and at the same time to the right (Fig. 15), the noses 29a and 29b (Figs. 2 and 6) of the selector bars that pass through the plate 40 limiting the movement to the right. If, however, a selector bar 29 is moved by its associated U-lever 28 to the left (Figs. 2 and 15) the noses 29a and 29b (Figs. 2 and 6) provided on each end of the selector bars will move past their punching yoke 41a or 41b respectively. The punching yoke will depress the selector bar which in turn will actuate the punch. It will be seen that only those selector bars or punches respectively will be depressed the noses of which are beneath the depressed punching yoke. In the embodiment described the punches for both decks are always selected simultaneously by the noses of the selector bars, however, only one deck will become effective because only one of the two punching yokes will be actuated. The yokes 41a, 41b are held in their home position by springs 43 (Figs. 3, 6) and the springs 44 will restore the punches 38 to their home position.

Figure 5:
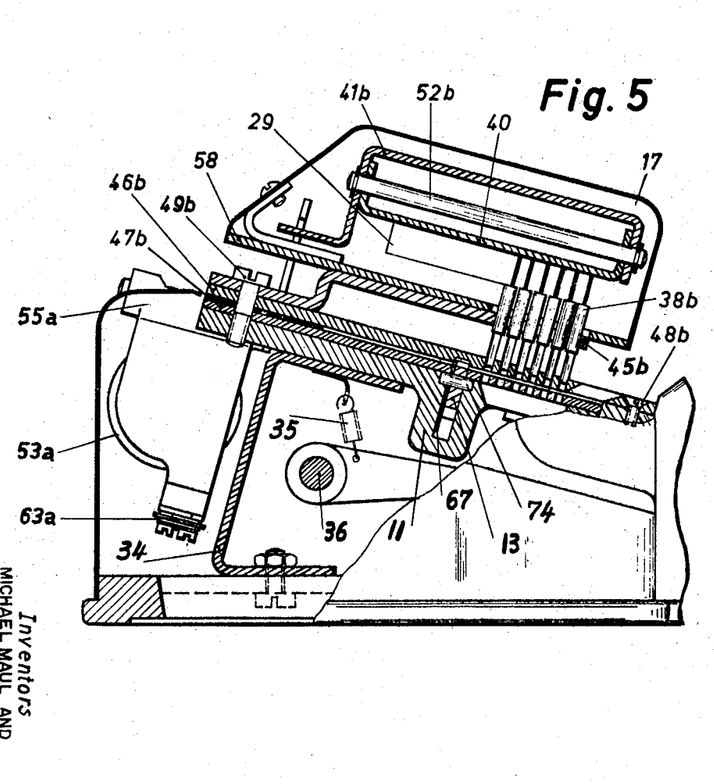
Fig. 5 is a section through the machine taken through the lower set of punches.

The punches 38 are guided in punch carriers (Figs. 4 and 5) provided as units. Each carrier consists of two guides 45a, 46a and 45b, 46b respectively. Both guides are riveted to each other as well as to their matrix 47a and 47b respectively and are fastened by means of screws 48a, 49a and 48b, 49b. The distance between the upper and lower guide is maintained by bolts 41 (Fig. 6) serving at the same time for the fastening of the punch springs 44. In the lower guide 46a, 46b the aforesaid recesses are provided (Fig. 1) in order to permit sight perforation. The punches 38 are of different length in order to obtain a smooth actuation upon punching.

Figure 7:
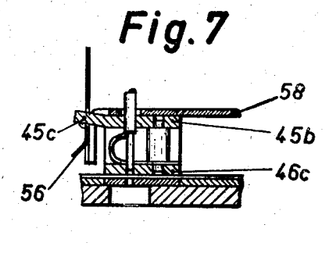
Fig. 7 shows the fastening of the controlling head on the set of punches.

The yokes 41a, 41b (Figs. 4, 5 and 15) are held by means of pins 52a, 52b on the plate 40. The actuation of the yokes is effected by the punch magnets 53a, 53b through armatures 55a, 55b (Figs. 3 and 13). The punch magnets are arranged symmetrically to each other on the rear side of the machine. The controlling head 17 (Figs. 6, 7 and 15) is held by springs 56 and 57 riveted to the plate 58 as well as by hinges 18a and 18b. The springs 56 and 57 engage behind a nose 45c of the upper guide 45a or 45b respectively (Fig. 7) and thereby prevent raising of the controlling head during punching operations. Upon raising of the controlling head both springs 56 and 57 are manually pressed outwardly whereby the locking is released.

In the hinges 18a and 18b, cast integral with the body, the pins 59a and 59b (Figs. 1, 8 and 11) are screwed; these pins extend into the eyes 58a and 58b of the plate 58 (Figs. 4, 8 and 15) thereby holding the same.

Plates 40 and 58 (Figs. 3, 4, 5, 6 and 15) are riveted to each other by means of distance pins and the guide pins 37. The distance pins have been omitted in the drawings for reasons of clarity.

Controlling of the punch magnets

Figure 10:
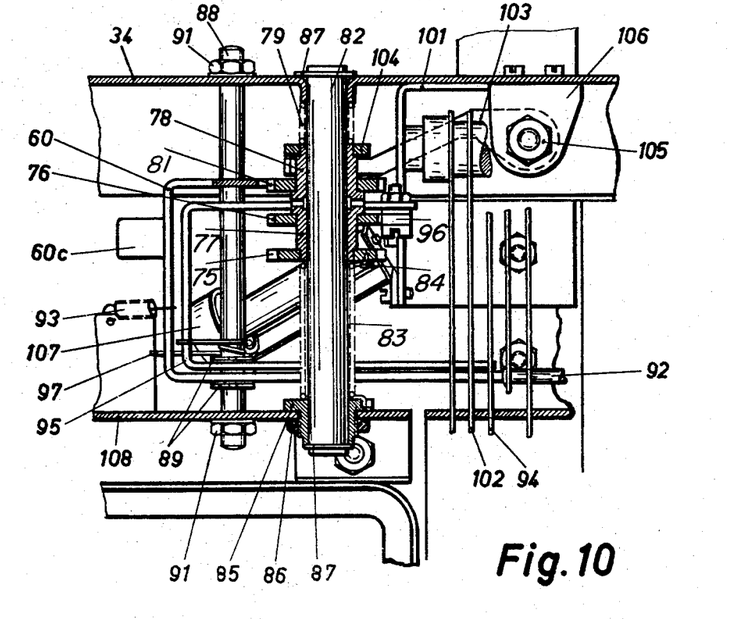
Figure 11:
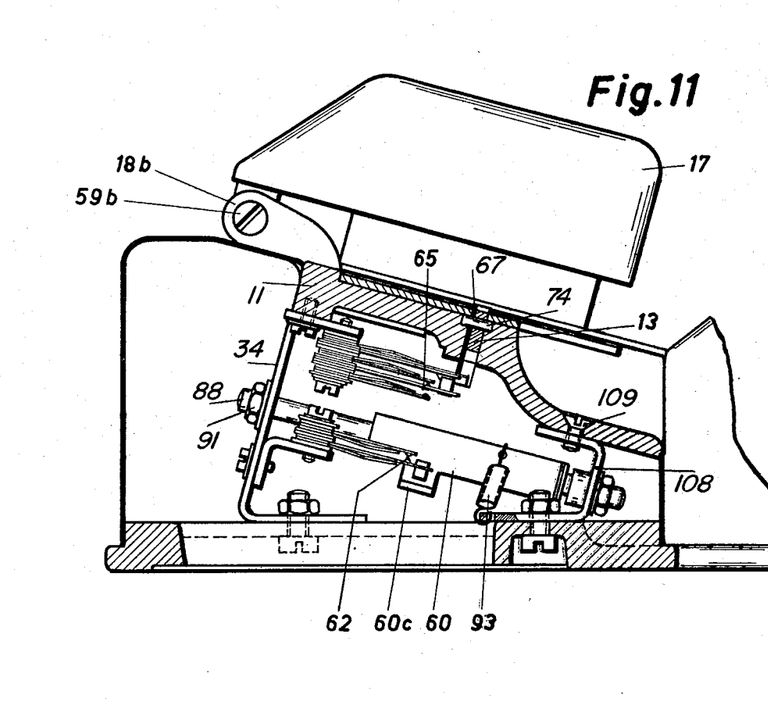
Figs. 11 and 12 illustrate the card carriage controlled deck shifting mechanism arranged on the left hand end of the machine casing.
Figure 12:
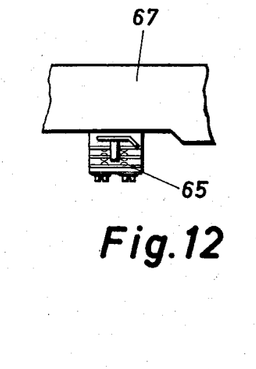
Figure 16:
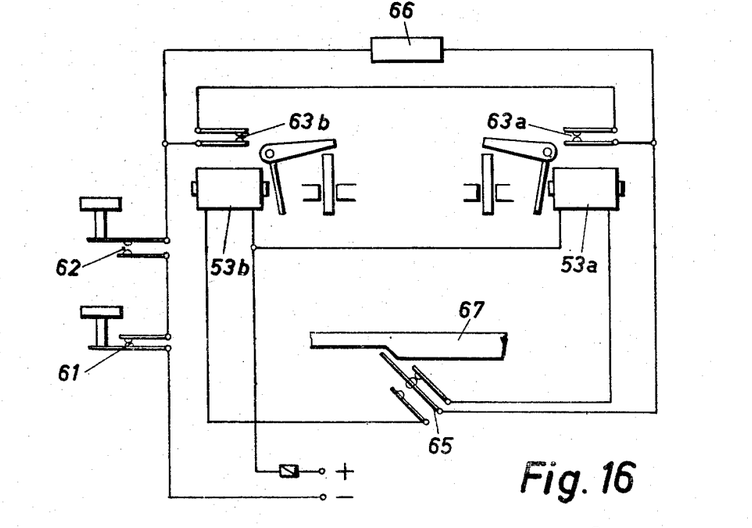
Fig. 16 shows the wiring diagram of the machine.

The control of the punch magnets 53a and 53b is effected through contacts 61, 62, 63a, 63b and 65 (Figs. 11, 12 and 16). If upon key actuation the locking lever 60 (Figs. 9, 10) of the escapement mechanism still to be described is actuated, the lip 60c of said locking lever will close the contact 62 and current will flow through the contacts 61, 62, 63b, 63a and 65 through the magnet 53a or 53b. Depending upon the adjustment of contact 65, the magnet 53a or 53b will be energized and will open its associated contact 63a or 63b respectively (Fig. 13) whereby the current circuit through these contacts will be interrupted. However the magnet 53a or 53b respectively will remain energized through the holding circuit through resistance 66 until contact 62 opens i. e. until the key is again released. The contacts 63a and 63b and the resistance 66 have been provided to protect the magnets from a too strong current and a too high temperature. If the protecting resistance 66 as well as contacts 63a and 63b were not provided and the key were held depressed too long the high initial current would always flow through the magnet and would destroy the coil within a short time.

Below the skip key there is provided a contact 61 (Fig. 4) fastened to the side wall of the casing. By depression of the skip key the lever 60 will be actuated by the general bar 92 (Figs. 9, 10) and the contact 62 will be closed (Fig. 11); the magnet, however, cannot be energized since the contact 61 has interrupted the current circuit before. This provision is necessary since carriage shifting must be effected by the skip key through lever 60 whereas the closure of contact 62 must not lead to an energization of the magnet.

For the fastening of the contacts 61 and 62 elongated holes are provided, permitting adjustment of the contacts. Thereby the contact 62 may be adjusted in such a way that it will close only at the last moment of the key actuation. Contact 61, however, is so adjusted that it opens immediately upon the start of the key depression. Shifting of magnet 53a to 53b takes place, as will be described later in connection with the operation of the machine, through the shift contact 65 which is actuated by the shift bar 67 fastened to the rack 13.

Escapement mechanism

Figure 14:
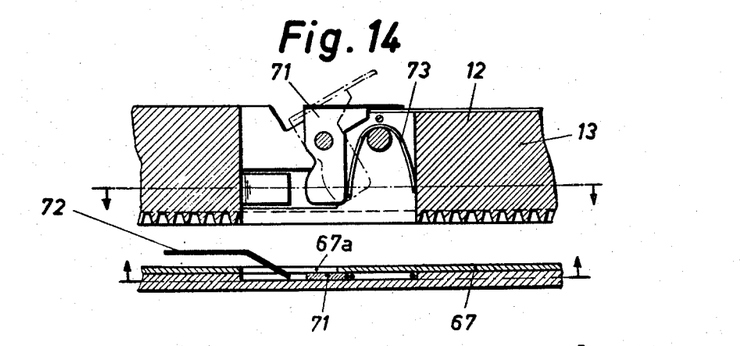
Fig. 14 shows in front view and in top view the card holder on the card carriage.

The column by column movement of the carriage is effected by means of the rack 13 through an escapement mechanism. Before describing the same it may first be mentioned how the card 12 is held on the rack 13 (Fig. 14).

On the end of the rack there is provided a recess accommodating an automatically closing card gripping device. The recess is covered by the shift bar 67 so that the gripping device with the exception of the holding element proper is protected against outside influences. In insertion position lever 71 is raised through pawl 72 (position in dashed lines). Pawl 72 is resiliently mounted on the left hand side of the bed and slides during its movement along the shift bar 67. Only in the inserting position can the pawl drop through a recess 67a in the shift bar onto the rack and may then engage the lever 71, rocking the same about its pivot. If the rack 13 is moved to the right, the pawl 72 will remain behind and the lever 71 is turned back by spring 73, thereby pressing the card 12 onto the rack. Upon the return stroke of the rack to insertion position, the pawl drops through recess 67a in the shift bar onto the rack and prevents the lever 71 from further movement. The latter will be pressed against spring 73, will rock about its pivot and will release the card 12.

Figure 8:
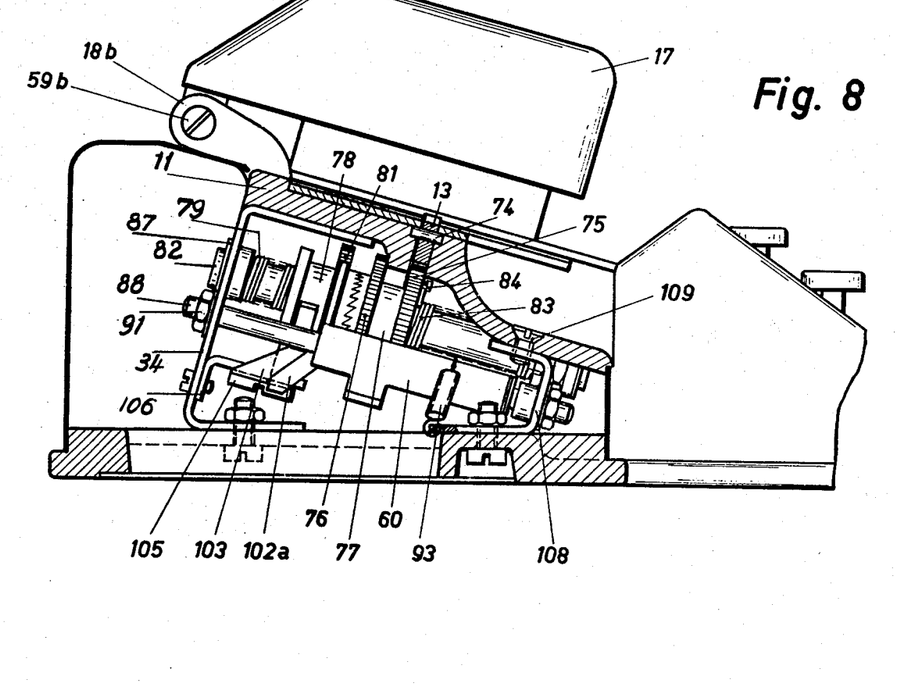
Fig. 8 is a section illustrating the arrangement of the shifting mechanism provided to the left (Fig. 1) of the key levers.

The rack 13 is guided in the bed 11 by pins 74 (Fig. 8). The pinion 75 (Figs. 8 and 10) engages the rack 13 and is rigidly pressed upon sleeve 77 together with ratchet wheel 76 for the back spacing key. The sleeve 77 has face teeth meshing with the face teeth of sleeve 78. Sleeve 78 is pressed by spring 79 against sleeve 77. The locking wheel 81 for the step by step movement is rigidly fastened to sleeve 78. Sleeves 77 and 78 are loosely rotatable upon the shaft 82. Movement of the sleeve 77 is prevented by engagement of the bed 11 between wheels 75 and 76 (Fig. 8). The feed drive for the rack is derived from the torsion spring 83 which is held on the pinion 75 by pin 84 and on the casing by the sleeve 85. The sleeve 85 is loosely rotatable in the casing and is rigidly held by screw nut 86. This provision has been made to permit adjustability of the spring. If the nut is loosened the sleeve 85 may be turned and thereby the spring may be tensioned. The axle is held in axial position by the split washers 87.

The step by step movement is effected through escapement wheel 81 and escapement lever 60 mounted on the axis 88. The lever 60 is secured upon the axis 88 against sideward movement by split washers 89. Holding and adjusting of the lever 60 into the proper position takes place through the axis 88 and the two nuts 91. Loosening of the one nut and fastening of the other one will cause a movement of the axis and therewith also a movement of the lever. Lever 60 reaches beneath the general bar 92, extending beneath the whole key board with the exception of back space and release key (Fig. 3), said bar being moved downward upon each key depression. The rear leg of the U-shaped lever 60 is constructed as an escapement element having the teeth 60a, 60b. Therefore, upon depression of lever 60 the lower tooth 60a will be disengaged from escapement wheel 81, while the upper one 60b will be engaged for locking operation. Upon this change of the teeth the escapement wheel will be turned for the first partial step under the influence of spring 83. When the key returns to home position again, the general bar will rise and the lever 60 will also be moved to its home position by spring 93 (Figs. 8, 10). Then the upper tooth 60b will be disengaged and the lower tooth 60a will again cause the locking. During this change of teeth the second partial step will occur. The first and second partial steps may be so arranged that the proportion of the complete step occupied by one partial step differs from that occupied by the other partial step as is known in other escapement mechanisms. The proportion of the complete step occupied by the respective partial steps will be referred to later.

Figure 9:
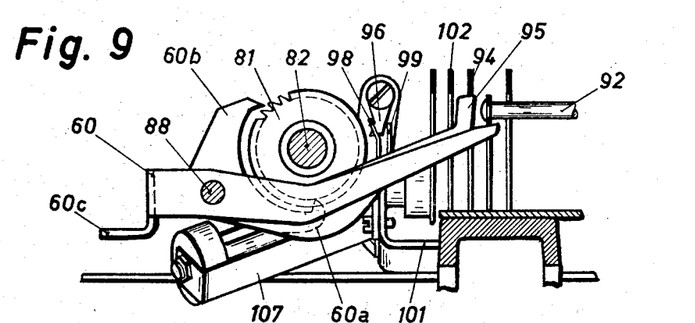
Figs. 9 and 10 show the shifting mechanism viewed from the front side and in top view.

Back spacing for one step is effected by the back space lever 94 (Figs. 9, 10), the lever 95 and the pawl 96 seated on the latter. Lever 95 is also U-shaped and mounted upon the axis 88. It is held together with the lever 60 by split washers 89. Lever 95 is held in its home position by spring 97. In the home position the pawl 96 is held disengaged from ratchet wheel 76 by the stop plate 98 (Fig. 9). If the back space key is actuated, the pawl 96 will move downward due to the rocking of lever 95 and will slide under influence of spring 99 through a recess of stop plate 98 into the teeth of ratchet wheel 76 for the back feed and will take along the latter. Stop plate 98 is fastened to the angle 101 serving at the same time as bearing for the axis 36. Through a slight bending the stop plate 98 may be so adjusted that the pawl 96 will properly engage into the tooth. Spring 99 is fastened to lever 95. Upon back feeding by the back space key or by hand the sleeve 78 will be pressed outward against spring 79 through the inclined tooth back of the face teeth (Fig. 8) and both sleeves will be disengaged. The face teeth of sleeve 77 will therefore slide over the face teeth of sleeve 78 arrested by the escapement lever 60.

If the rack is to be entirely released in order to return the carriage to the left hand end position, the release key 102 must be actuated. Through the nose 102a of the latter the lever 103 which engages between wheel 81 and ring 104 (Fig. 10) will be pressed backward. The latter is also fastened to sleeve 78. Lever 103 is rotatably mounted by means of screw 105 on angle 106 (Figs. 8, 10) which latter is screwed to the angle 34. Lever 103 moves the sleeve 78 outward whereby the front teeth will be disengaged. Thereby the sleeve 77 with the pinion 75 will be released and spring 83 can relax so that wheel 75 can take the rack with it to the left. In order to avoid too great a velocity of the rack the wheel 75 drives through a worm a centrifugal brake 107 of any known type.

The whole escapement mechanism is held between the two angles 34 and 108 (Figs. 8, 10) serving at the same time as support for the bed. The bed 11 is fastened upon the angles 34 and 108 by means of screws 109.

*Operation*

Figure 1:
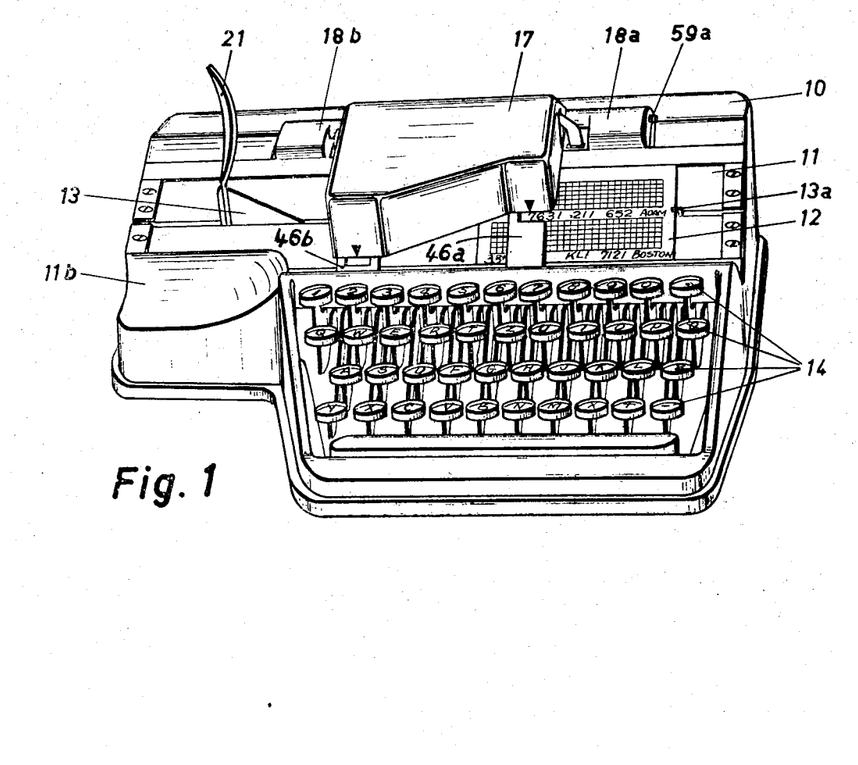
Fig. 1 is a perspective view of the machine which is provided with letter and numeral keys, said machine having about the size of a portable typewriter.

The card is inserted at the left hand side of the bed (Fig. 1). The rack 13 is moved by handle 21 together with the card 12 to the right hand end position, the card holder 71 (Fig. 14) being closed during this movement. By moving the rack to the right, spring 83 will be tensioned (Figs. 8, 10). When a key is actuated, the translator bars 23 (Figs. 2, 3) are moved according to the perforation code. The actuation is transmitted over the levers 27 and 28 to the selector bars 29. The key depresses at the same time the general bar 92 (Figs. 3 and 9) whereby locking lever 60 is actuated. The movement of lever 60 causes tooth 60a to become ineffective so that the first partial step of the escapement wheel 81 takes place. Upon further movement of lever 60 the latter will close with its lip 60c the contact 62 (Fig. 11) which (as mentioned before) is so adjusted that it will only be closed at the last moment. Magnet 53a (Figs. 2 and 16) will be energized, armature 55a and yoke 41a are actuated and yoke 41a depresses the adjusted selector bars 29 through noses 29a and therewith the associated punches 38a. The punches will punch the card. General bar 92 and lever 60 will return in the meantime to home position and contact 62 (Figs. 9, 11, 16) will be interrupted so that magnet 53a will be de-energised. Punches, yoke and controlling bars are returned to home position through their respective springs.

Upon the return of lever 60 the tooth 60b becomes ineffective and tooth 60a becomes effective so that the second partial step of the escapement wheel occurs. The first and second partial steps must be such that, on the one hand there is no movement at the moment of punching and that, on the other hand the punches have already been retracted from the card, when the second partial step of the card begins. This is obtained by making the first partial step rather large, the second one, however, rather small. This division is due to responding time and inertia of the magnet since the current needs a certain time for building up and reducing the magnet field. Therefore the movement of the armature will follow the actuation of the contact for some milliseconds. If the second partial step were made too large, the card would be moved before the punches have returned to their home position. If, however, the first partial step is made large, the card is already at rest before the punches cause punching since on the one hand the contact 62 can only be closed if the first partial step has actually taken place and on the other hand the magnet will respond only some milliseconds later.

If the skip key (for skipping of the carriage) is actuated, the same operation will be repeated with the only difference that no translator bars 63 are moved and that responding of the magnets is prevented due to opening of contacts 61. Therefore there remains only the change of teeth by lever 60 (Fig. 9) and therewith the feed of the carriage for one step. If the back space key 94 (Figs. 9, 10) is depressed, it will actuate the lever 95 with pawl 96. Under the influence of spring 99 the pawl 96 will slide from the stop plate 98 upon the ratchet wheel 76 and will take the same with it. Turning of wheel 81 is prevented by lever 60. The inclined backs of the face teeth press the sleeve 78 outwardly which will be engaged again behind the next tooth by spring 79.

If the release key 102 is depressed it will actuate through nose 102 (Fig. 8) the lever 103. Lever 103 moves the sleeve 78 outward. Sleeve 77 together with pinion 75 will be released and the rack will be moved to the left by spring 83.

When the upper deck has been operated upon the contact 65 (Figs. 11, 16) is shifted by the shift bar 67 seated on the rack 13, whereby magnet 53a is eliminated from the current circuit and magnet 53b actuating the lower set of punches is included. The lower set of punches is so arranged that upon deck change the key actuation may be continued without interruption.

What we claim is:

1. In a machine for punching combination holes in double deck record cards, an individual column of punches for each deck, said columns of punches being offset relatively to each other in the direction of the card feed by the length of one deck and being arranged to leave the printed characters in the space below the card column being punched visible during punching, a set of actuating keys common to both columns of punches, means for moving the card past said punches column by column upon punching operation, a card bed, said set of keys controlling by key levers a set of longitudinally movable translator bars, both said set of key levers and said set of translator bars being disposed beneath the card bed, a set of U-shaped controlling stirrups embracing with their open sides the rear of the card bed of the machine and being rockably mounted thereon, the lower legs of the stirrups being under the control of said translator bars while the upper legs engage punch selector bars extending between and common to said two columns of punches, the selector bars being cranked and extending between the upper and the lower columns of punches and above said punches, and means controlled in dependence on the position of the card relative to said columns of punches for automatically rendering the common set of keys effective upon that column of punches past which the associated record deck is passing.

2. In a machine for punching combination holes in double deck record cards, an individual column of punches for each deck and a punch magnet for each column of punches, said columns of punches being offset relatively to each other in the direction of the card feed by the length of one deck, a card bed, a set of actuating keys common to both columns of punches, means for moving the card relatively to said columns of punches column by column upon a punching operation, said set of keys controlling by key levers a set of longitudinally movable translator bars, both said set of key levers and said set of translator bars being disposed beneath the card bed, a set of U-shaped controlling stirrups embracing with their open sides the rear of the card bed and being rockably mounted thereon and extending with their upper legs between said columns of punches while their lower legs are under the control of said translator bars, the upper legs of said stirrups engaging cranked punch selector bars common to and extending over both columns of punches, said selector bars being adapted to establish an operative connection between the armatures of said punch magnets and the punches of both columns of punches, and means controlled in dependence on the position of the card relative to said columns of punches for automatically rendering the common set of keys effective only upon that punch magnet past the punches of which the associated record deck is passing.

3. A machine for perforating multi-deck record cards in accordance with a predetermined code, comprising a plurality of columns of punches, each appropriated to a different deck, said columns being spaced apart in the direction of the card feed by a distance equal to the length of a deck and offset from one another in the direction at right angles to the card feed direction by a distance equal to the height of one deck, whereby each deck in turn passes under its associated column of punches, electromagnetic punch actuating means for each of said columns of punches, means for feeding a card column by column past said columns of punches, a set of selector bars common to all said columns of punches, said selector bars being adapted to establish an operative connection between all of said punch actuating means and the punches of all columns of punches, a card bed, a set of keys common to all columns of punches, a set of code translator bars under the card bed and movable longitudinally of said card bed under control of said keys in accordance with a predetermined code, a group of U-shaped controlling stirrups embracing with their open sides the rear of the card bed and being rockably mounted thereon, the upper legs of said stirrups engaging the selector bars while their lower legs are under the control of the translator bars, and means controlled in dependence on the position of the card relative to said columns of punches for automatically rendering the common set of keys effective only upon that punch actuating means past the punches of which the associated record deck is passing.

References Cited in the file of this patent

UNITED STATES PATENTS

| | | |
|---|---|---|
| 1,965,975 | Ford | July 10, 1934 |
| 2,419,781 | Keefe | Apr. 29, 1947 |
| 2,421,069 | Kelley | May 27, 1947 |